(12) United States Patent
Watanabe et al.

(10) Patent No.: US 6,663,507 B1
(45) Date of Patent: Dec. 16, 2003

(54) MULTI-PIECE SOLID GOLF BALL

(75) Inventors: Hideo Watanabe, Chichibu (JP); Rinya Takesue, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 10/197,216

(22) Filed: Jul. 18, 2002

(51) Int. Cl.⁷ .............................................. A63B 37/06
(52) U.S. Cl. ..................................................... 473/373
(58) Field of Search ................................ 473/351, 367, 473/368, 370, 371, 373, 374, 376, 377, 378

(56) References Cited

U.S. PATENT DOCUMENTS

| | | | |
|---|---|---|---|
| 5,553,852 A | | 9/1996 | Higuchi et al. |
| 5,586,950 A | | 12/1996 | Endo |
| 5,782,707 A | | 7/1998 | Yamagishi et al. |
| 5,830,085 A | * | 11/1998 | Higuchi et al. ............. 473/373 |
| 5,947,842 A | * | 9/1999 | Cavallaro et al. ........... 473/373 |
| 6,124,389 A | * | 9/2000 | Cavallaro et al. ........... 524/432 |
| 6,210,293 B1 | * | 4/2001 | Sullivan ...................... 473/374 |
| 6,248,028 B1 | * | 6/2001 | Higuchi et al. ............. 473/374 |
| 6,422,954 B1 | * | 7/2002 | Dewanjee .................... 473/378 |

FOREIGN PATENT DOCUMENTS

| | | |
|---|---|---|
| GB | 2278609 A | 12/1994 |
| JP | 6-343718 A | 12/1994 |
| JP | 7-024085 | 1/1995 |
| JP | 7-194736 A | 8/1995 |
| JP | 9-239068 | 9/1997 |

\* cited by examiner

*Primary Examiner*—Steven Wong
*Assistant Examiner*—Raeann Gorden
(74) *Attorney, Agent, or Firm*—Sughrue Mion, PLLC

(57) ABSTRACT

A multi-piece solid golf ball includes a core, at least one mantle layer enclosing the core, and a cover that is made primarily of a thermoplastic polyurethane composition. The cover and the mantle layer have a difference in Shore D hardness therebetween such that $-8 \leq [(\text{cover hardness}) - (\text{mantle layer hardness})] \leq 5$. The cover and the core have a difference in Shore D hardness therebetween such that $5 \leq [(\text{cover hardness}) - (\text{average core hardness})] \leq 25$. The core has an average Shore D hardness of 30 to 50, and the cover has a Shore D hardness of at least 52. The ball has an initial velocity of at least 76.4 m/s.

22 Claims, 1 Drawing Sheet

MULTI-PIECE SOLID GOLF BALL

BACKGROUND OF THE INVENTION

The present invention relates to multi-piece solid golf balls having a core, at least one mantle layer, and a cover.

Golf balls in which a soft cover serves as the outermost layer have been proposed to meet the requirements of professional golfers and skilled amateurs (see, for example, JP-A 6-343718, JP-A 7-194736, JP-A 7-24085 and JP-A 9-239068).

In such golf balls, the outermost layer which comes into contact with the golf club is generally an ionomer cover. A desire has thus existed for further improvement in scuff resistance to shots made with a short iron or a wedge.

Moreover, there is a widespread desire among golfers for balls which, in addition to being endowed with better scuff resistance, also have good resistance to cracking with repeated impact, a good feel upon impact, and good spin stability.

SUMMARY OF THE INVENTION

It is therefore an object of the invention to provide golf balls which, even when used by ordinary golfers having amateur-level head speeds, provide a good balance between the flight characteristics, controllability, spin stability, feel, scuff resistance and durability to repeated impact.

We have found that multi-piece solid golf balls which are composed of a core, at least one mantle layer enclosing the core, and a cover that is made of a thermoplastic polyurethane composition, in which the average hardness of the core, the cover hardness, the difference between the cover hardness and the mantle layer hardness, and the difference between the outermost layer hardness and the average core hardness have each been optimized, and which have been imparted with a high initial velocity exhibit a good balance between the flight characteristics, controllability, spin stability, feel upon impact, scuff resistance and durability to repeated impact, even when used by golfers having a head speed of about 40 m/s or less.

Accordingly, the invention provides the following golf balls.

(I) A multi-piece solid golf ball having a core, at least one mantle layer enclosing the core, and a cover; wherein the cover is made primarily of a thermoplastic polyurethane composition, the cover and the mantle layer have a difference in Shore D hardness therebetween such that $-8 \leq [(\text{cover hardness})-(\text{mantle layer hardness})] \leq 5$, the cover and the core have a difference in Shore D hardness therebetween such that $5 \leq [(\text{cover hardness})-(\text{average core hardness})] \leq 25$, the core has an average Shore D hardness of 30 to 50, the cover has a Shore D hardness of at least 52, and the ball has an initial velocity of at least 76.4 m/s.

(II) The multi-piece solid golf ball of (I) above, wherein the core is made of an organosulfur compound-containing rubber composition.

(III) The multi-piece solid golf ball of (I) above, wherein the difference in Shore D hardness between the cover and the mantle layer is such that $-3 \leq [(\text{cover hardness})-(\text{mantle layer hardness})] \leq 3$.

(IV) The multi-piece solid golf ball of (I) above, wherein the cover and the core have a difference in Shore D hardness therebetween such that $15 \leq [(\text{cover hardness})-(\text{core center hardness})] \leq 25$.

(V) The multi-piece solid golf ball of (I) above, wherein the core has an average Shore D hardness of 35 to 45.

(VI) The multi-piece solid golf ball of (I) above, wherein the thermoplastic polyurethane composition includes (A) a thermoplastic polyurethane and (B) an isocyanate mixture prepared by dispersing (b-1) a compound having as functional groups at least two isocyanate groups per molecule in (b-2) a thermoplastic resin that is substantially non-reactive with isocyanate.

(VII) The multi-piece solid golf ball of (I) above, wherein the mantle layer is composed primarily of a mixture prepared from a base resin of (C) an ionomer resin component containing
  (c-1) an olefin/unsaturated carboxylic acid random bipolymer and/or a metal ion neutralization product of an olefin/unsaturated carboxylic acid random bipolymer, and
  (c-2) an olefin/unsaturated carboxylic acid/unsaturated carboxylic acid ester random terpolymer and/or a metal ion neutralization product of an olefin/unsaturated carboxylic acid/unsaturated carboxylic acid ester random terpolymer in a weight ratio (c-1)/(c-2) of 100/0 to 25/75, and (D) a non-ionomer thermoplastic elastomer in a weight ratio C/D of 100/0 to 50/50, to which base resin is added:

(E) a fatty acid having a molecular weight of 280 to 1,500 or a derivative thereof, and (F) a basic metal compound such as to satisfy the respective weight ratios $(C+D)/E=100/5$ to $100/80$ and $(C+D)/F=100/0.1$ to $100/10$.

(VIII) The multi-piece solid golf ball of (VII) above, wherein the non-ionomer thermoplastic elastomer (D) is an olefin thermoplastic elastomer containing crystalline polyethylene blocks as hard segments.

DETAILED DESCRIPTION OF THE INVENTION

Figure 1:
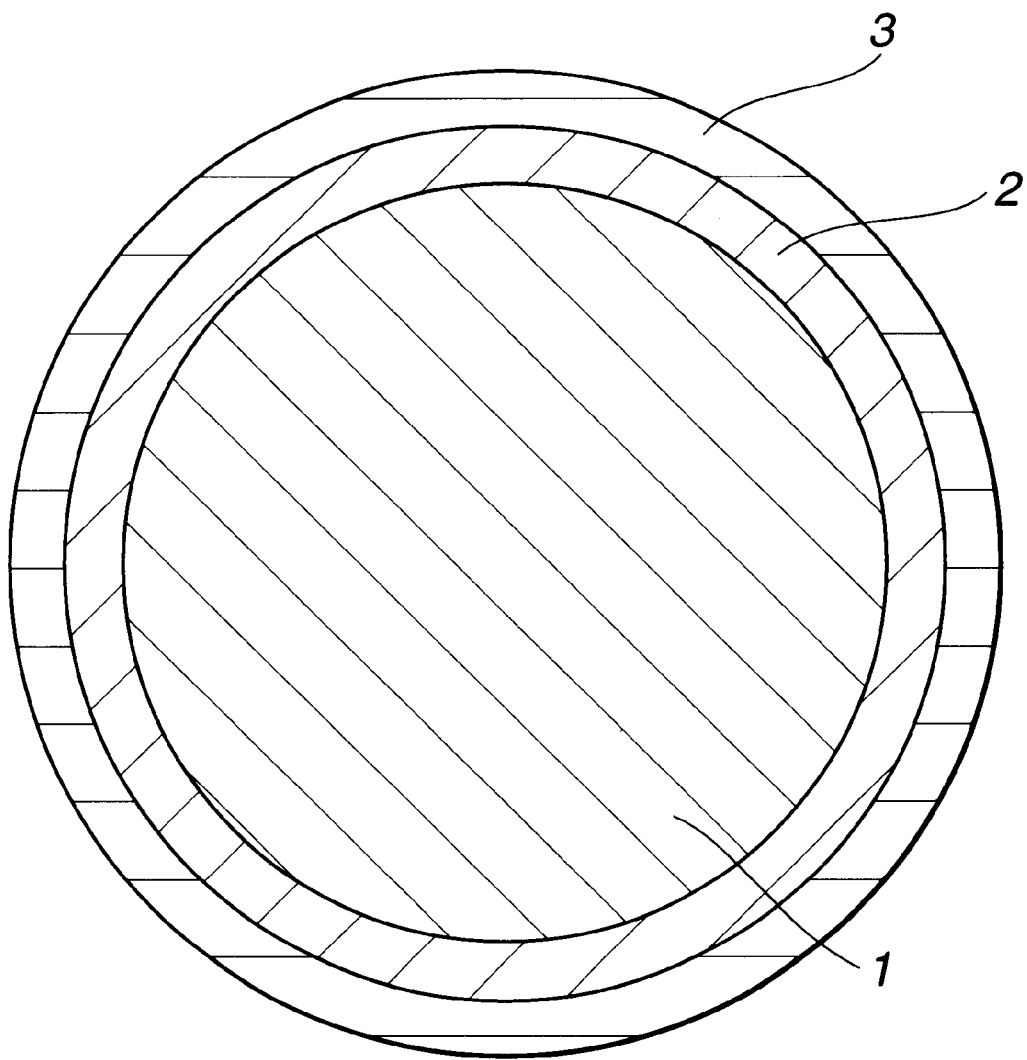
FIG. 1 is a schematic sectional view showing a golf ball according to one embodiment of the invention.

The invention is described more fully below.

Referring to FIG. 1, which shows a multi-piece solid golf ball according to one embodiment of the invention, the inventive ball has a core 1, a mantle layer 2 enclosing the core 1, and a cover layer 3 enclosing the mantle layer 2. The ball may have more than one mantle layer.

The core of the inventive golf ball can be formed using a rubber composition containing, for example, a co-crosslinking agent, an organic peroxide, an inert filler and an organosulfur compound. The base rubber of the rubber composition is preferably composed primarily of polybutadiene.

The polybutadiene is not subject to any particular limitation. Any polybutadiene used in golf ball cores may be employed, although 1,4-polybutadiene having a cis structure of at least 40% is preferred. If desired, other rubbers such as natural rubber, polyisoprene rubber or styrene-butadiene rubber may be blended with polybutadiene to form the base rubber.

Exemplary co-crosslinking agents include unsaturated carboxylic acids and the metal salts of unsaturated carboxylic acids.

Illustrative examples of unsaturated carboxylic acids include acrylic acid, methacrylic acid, maleic acid and fumaric acid. Acrylic acid and methacrylic acid are especially preferred.

No particular limitation is imposed on the metal salts of unsaturated carboxylic acids. For example, any of the above-mentioned unsaturated carboxylic acids neutralized with the desired metal ions may be used. Specific examples include the zinc and magnesium salts of unsaturated fatty acids such as methacrylic acid and acrylic acid. Zinc acrylate is especially preferred.

The unsaturated carboxylic acids and/or metal salts thereof are generally used in an amount, per 100 parts of the above-described base rubber, of at least 10 parts by weight, preferably at least 15 parts by weight, and most preferably at least 20 parts by weight, but not more than 60 parts by weight, preferably not more than 50 parts by weight, more preferably not more than 45 parts by weight, and most preferably not more than 40 parts by weight. Too much tends to give the golf ball a feel upon impact that is difficult to endure, whereas too little may diminish the rebound characteristics of the ball.

The organic peroxide may be a commercial product, suitable examples of which include Percumil D (manufactured by NOF Corporation), Perhexa 3M (manufactured by NOF Corporation) and Luperco 231XL (manufactured by Atochem Co.). Any one or combinations of two or more thereof may be used.

The organic peroxide is generally included in an amount, per 100 parts by weight of the base rubber, of at least 0.1 part by weight, preferably at least 0.3 part by weight, more preferably at least 0.5 part by weight, and most preferably at least 0.7 part by weight, but not more than 5 parts by weight, preferably not more than 4 parts by weight, more preferably not more than 3 parts by weight, and most preferably not more than 2 parts by weight. Too much or too little organic peroxide may make it impossible to achieve a ball having a good feel upon impact and good durability and rebound characteristics.

Examples of inert fillers that may be used as include zinc oxide, barium sulfate and calcium carbonate. Any one or combinations of two or more thereof may be used.

The inert filler is generally included in an amount, per 100 parts by weight of the base rubber, of at least 5 parts by weight, and preferably at least 7 parts by weight, but not more than 50 parts by weight, preferably not more than 40 parts by weight, more preferably not more than 30 parts by weight, and most preferably not more than 20 parts by weight. Too much or too little inert filler may make it impossible to achieve a golf ball having an appropriate weight and good rebound characteristics.

If necessary, the rubber composition may include also an antioxidant, suitable examples of which include such commercial products as Nocrac NS-6, Nocrac NS-30 (both made by Ouchi Shinko Chemical Industry Co., Ltd.), and Yoshinox 425 (made by Yoshitomi Pharmaceutical Industries, Ltd.). Any one or combinations of two or more thereof may be used.

The antioxidant is generally included in an amount, per 100 parts by weight of the base rubber, of at least 0 part by weight, preferably at least 0.05 part by weight, more preferably at least 0.1 part by weight, and most preferably at least 0.2 part by weight, but not more than 3 parts by weight, preferably not more than 2 parts by weight, more preferably not more than 1 part by weight, and most preferably not more than 0.5 part by weight. Too much or too little antioxidant may make it impossible to achieve good rebound characteristics and durability.

It is preferable for the core of the golf ball to include an organosulfur compound so as to enhance the rebound characteristics of the ball and increase its initial velocity.

The organosulfur compound is not subject to any particular limitation, provided it is able to enhance the rebound characteristics of the ball. Exemplary organosulfur compounds include thiophenols, thionaphthols, halogenated thiophenols, and metal salts thereof. Specific examples include pentachlorothiophenol, pentafluorothiophenol, pentabromothiophenol, p-chlorothiophenol, the zinc salt of pentachlorothiophenol, the zinc salt of pentafluoro thiophenol, the zinc salt of pentabromothiophenol, the zinc salt of p-chlorothiophenol, and organosulfur compounds having 2 to 4 sulfurs, such as diphenylpolysulfides, dibenzylpolysulfides, dibenzoylpolysulfides, dibenzothiazoylpolysulfides and dithiobenzoylpolysulfides. Diphenyldisulfide and the zinc salt of pentachlorothiophenol are especially preferred.

It is recommended that the organosulfur compound be included in an amount, per 100 parts by weight of the base rubber, of generally at least 0.05 part by weight, preferably at least 0.1 part by weight, and most preferably at least 0.2 part by weight, but generally not more than 5 parts by weight, preferably not more than 4 parts by weight, more preferably not more than 3 parts by weight, and most preferably not more than 2.5 parts by weight. Too much organosulfur compound may cause the effects of addition to reach a point at which no further improvement occurs, whereas too little addition may make it impossible to fully achieve the desired effects.

The core can be produced by subjecting the rubber composition containing the various above constituents to vulcanization and curing by a known method. Typically, the rubber composition is worked with a mixing apparatus such as a Banbury mixer or a roll mill, then compression molded or injection molded in a core mold. The molded core is then cured by appropriate heating at a temperature sufficient for the organic peroxide and the co-crosslinking agent to act. When dicumyl peroxide is used as the organic peroxide and zinc acrylate is used as the co-crosslinking agent, heating is generally carried out at about 130 to 170° C., and preferably 150 to 160° C., for about 10 to 40 minutes, and preferably 12 to 20 minutes.

Unless noted otherwise, "hardness," as used herein, refers to the Shore D hardness.

In the practice of the invention, the core generally has a surface hardness, in Shore D hardness units, of at least 30, preferably at least 35, and most preferably at least 40, but not more than 60, preferably not more than 55, and most preferably not more than 50.

The core generally has a center hardness of at least 30, preferably at least 32, and most preferably at least 34, but not more than 42, preferably not more than 40, and most preferably not more than 38.

"Average core hardness," as used herein, refers to the arithmetic mean of the core surface hardness and the core center hardness. The average core hardness is generally at least 30, preferably at least 33, more preferably at least 35, and most preferably at least 37, but generally not more than 50, preferably not more than 48, more preferably not more than 45, and most preferably not more than 44.

At a core surface hardness, core center hardness or average core hardness below the above-indicated ranges, the ball may have too soft and inadequate a feel upon impact and diminished rebound characteristics, resulting in a poor distance. On the other hand, if any of these hardness values is too high, the ball may have too lively a feel and a tendency to describe a high arc in flight.

The value obtained by subtracting the core center hardness from the core surface hardness, expressed in Shore D units, is generally at least 5, preferably at least 6, and more preferably at least 7, but generally not more than 15, preferably not more than 13, and most preferably not more than 9. If the value obtained by subtracting the core center hardness from the core surface hardness is too small, when the ball is hit with a driver (number one wood, W#1), it may take on too much spin and follow a high trajectory, resulting in a reduced distance. On the other hand, if the value obtained by subtracting the core center hardness from the core surface hardness is too large, the rebound characteristics may be too low, resulting in decreased distance.

The hardness in each part of the core can be set within the above-indicated ranges by suitably selecting, for example, the types and amounts of materials formulated in the core, the types and amounts of organic peroxide and co-crosslinking agent included, and the vulcanizing conditions.

The above-described core may be given a construction composed of a single layer or a plurality of layers. Formation as a plurality of layers, and especially two layers, is preferred for control of the spin rate. When a core having a plurality of layers is used, "core surface hardness," as used herein, refers to the surface hardness of the outermost layer of the core.

The core has a diameter of preferably at least 25 mm, and most preferably at least 36 mm, but preferably not more than 40 mm, and most preferably not more than 38 mm. The core has a weight of preferably 20 to 32 g, and most preferably 27 to 30 g.

The cover in the multi-piece solid golf ball of the invention is made primarily of a thermoplastic polyurethane composition. The thermoplastic polyurethane composition preferably includes (A) a thermoplastic polyurethane and (B) an isocyanate mixture.

By forming the cover in the multi-piece solid golf ball of the invention primarily of the above-described thermoplastic polyurethane composition, golf balls of excellent feel, controllability, cut resistance, scuff resistance and durability to repeated impact can be obtained.

The thermoplastic polyurethane (A) is not subject to any particular limitation, so long as it is a thermoplastic elastomer composed primarily of polyurethane, although thermoplastic polyurethanes made up of polymeric polyols as the soft segments, and chain extenders and diisocyanates as the hard segments are preferred.

Any polymeric polyol employed in the prior art relating to thermoplastic polyurethane materials may be used without particular limitation. Examples include polyester polyols, polyether polyols, copolyester polyols and polycarbonate polyols, any of which may be used with good results. Of these, polyether polyols are preferred for the preparation of thermoplastic polyurethanes having excellent impact resilience and low-temperature properties, and polyester polyols are preferred for their heat resistance and broad molecular design capabilities.

Illustrative examples of polyester polyols include polycaprolactone glycol, poly(ethylene 1,4-adipate) glycol and poly(butylene 1,4-adipate) glycol.

Suitable examples of polyether polyols include polytetramethylene glycol and polypropylene glycol. Polytetramethylene glycol is preferred.

One example of a suitable copolyester polyol is poly (diethylene glycol adipate) glycol.

One example of a suitable polycarbonate polyol is poly (hexanediol-1,6-carbonate) glycol.

These polymeric polyols generally have a number-average molecular weight of at least 500, preferably at least 1,000, and most preferably at least 2,000, but not more than 5,000, preferably not more than 4,000, and most preferably not more than 3,000.

Any diisocyanate employed in the prior art relating to thermoplastic polyurethane materials may be used without particular limitation. Illustrative examples include 4,4'-diphenylmethane diisocyanate, 2,4-toluene diisocyanate, 2,6-toluene diisocyanate, hexamethylene diisocyanate, 2,2, 4- and 2,4,4-trimethylhexamethylene diisocyanate, lysine diisocyanate and tolylene diisocyanate.

However, depending on the type of isocyanate used, control of the crosslinking reaction during injection molding can be difficult. In the practice of the invention, the use of 4,4'-diphenylmethane diisocyanate is preferred for good compatibility with the subsequently described isocyanate mixture.

Any chain extender employed in the prior art relating to thermoplastic polyurethane materials may be used without particular limitation. For instance, use may be made of any ordinary polyhydric alcohol or amine. Specific examples include 1,4-butylene glycol, 1,2-ethylene glycol, 1,3-butanediol, 1,6-hexanediol, 2,2-dimethyl-1,3-propanediol, dicyclohexylmethylmethanediamine (hydrogenated MDI) and isophoronediamine (IPDA).

These chain extenders generally have a number-average molecular weight of at least 20, but not more than 15,000.

No limitation is imposed on the specific gravity of the thermoplastic polyurethane, so long as it is suitably controlled within a range that allows the objects of the invention to be achieved. The specific gravity is preferably from 1.0 to 1.3, and most preferably from 1.1 to 1.25.

The above-described thermoplastic polyurethane used in the invention may be a commercial product. Illustrative examples include Pandex T8290, T8295 and T8260 (all manufactured by DIC Bayer Polymer, Ltd.), and Resamine 2593 and 2597 (manufactured by Dainichi Seika Colour & Chemicals Mfg. Co., Ltd.).

The isocyanate mixture (B) is preferably one prepared by dispersing (b-1) a compound having as functional groups at least two isocyanate groups per molecule in (b-2) a thermoplastic resin that is substantially non-reactive with isocyanate The compound having as functional groups at least two isocyanate groups per molecule which serves as component (b-1) may be an isocyanate compound used in the prior art relating to polyurethanes, such as an aromatic isocyanate compound, a hydrogenated aromatic isocyanate compound, an aliphatic diisocyanate or an alicyclic diisocyanate.

Suitable examples of aromatic isocyanate compounds include 2,4-toluene diisocyanate, 2,6-toluene diisocyanate, mixtures of 2,4-toluene diisocyanate with 2,6-toluene diisocyanate, 4,4'-diphenylmethane diisocyanate, m-phenylene diisocyanate and 4,4'-diphenyl diisocyanate.

Suitable examples of hydrogenated aromatic isocyanate compounds include dicyclohexylmethane diisocyanate.

Suitable examples of aliphatic diisocyanates include tetramethylene diisocyanate, hexamethylene diisocyanate and octamethylene diisocyanate.

Suitable examples of alicyclic diisocyanates include isophorone diisocyanate.

To assure good reactivity and work safety, the use of 4,4'-diphenylmethane diisocyanate is preferred.

The thermoplastic resin that is substantially non-reactive with isocyanate which serves as component (b-2) is preferably a resin having a low water absorption and excellent compatibility with thermoplastic polyurethane materials. Illustrative, non-limiting, examples of such resins include polystyrene resins, polyvinyl chloride resins, ABS resins, polycarbonate resins and polyester thermoplastic elastomers (e.g., polyether-ester block copolymers, polyester-ester block copolymers).

For good impact resilience and strength, the use of a polyester thermoplastic elastomer is especially preferred. No particular limitation is imposed on the polyester thermoplastic elastomer, provided it is a thermoplastic elastomer composed primarily of polyester. The use of a polyester-based block copolymer composed primarily of high-melting crystalline polymer segments made of crystalline aromatic polyester units and low-melting polymer segments made of aliphatic polyether units and/or aliphatic polyester units is preferred.

Preferred examples of the high-melting crystalline polymer segments made of crystalline aromatic polyester units include polybutylene terephthalate derived from terephthalic acid and/or dimethyl terephthalate in combination with 1,4-butanediol. Other suitable, non-limiting, examples include polyesters derived from a dicarboxylic acid component such as isophthalic acid, phthalic acid, naphthalene-2,6-dicarboxylic acid, naphthalene-2,7-dicarboxylic acid, diphenyl-4,4'-dicarboxylic acid, diphenoxyethanedicarboxylic acid, 5-sulfoisophthalic acid or an ester-forming derivative thereof in combination with a diol having a molecular weight of up to 300, such as an aliphatic diol (e.g., ethylene glycol, trimethylene glycol, pentamethylene glycol, hexamethylene glycol, neopentyl glycol, decamethylene glycol), an alicyclic diol (e.g., 1,4-cyclohexanedimethanol, tricyclodecanedimethylol), or an aromatic diol (e.g., xylylene glycol, bis(p-hydroxy)diphenyl, bis(p-hydroxy-phenyl)propane, 2,2-bis[4-(2-hydroxyethoxy)phenyl]propane, bis[4-(2-hydroxy)phenyl]sulfone, 1,1-bis[4-(2-hydroxyethoxy)phenyl]cyclohexane, 4,4'-dihydroxy-p-terphenyl and 4,4'-dihydroxy-p-quarterphenyl). Use can also be made of any copolymeric polyester obtained using two or more of these dicarboxylic acid components and diol components.

In addition, polycarboxylic acid components, polyoxy components and polyhydroxy components having a functionality of three or more can be copolymerized therein within a range of up to 5 mol %.

In the low-melting polymer segments made of aliphatic polyether units and/or aliphatic polyester units, illustrative examples of the aliphatic polyether include poly(ethylene oxide) glycol, poly(propylene oxide) glycol, poly(tetramethylene oxide) glycol, poly(hexamethylene oxide) glycol, copolymers of ethylene oxide and propylene oxide, ethylene oxide addition polymers of poly(propylene oxide) glycols, and copolymers of ethylene oxide and tetrahydrofuran. Illustrative examples of the aliphatic polyester include poly($\epsilon$-caprolactone), polyenantholactone, polycaprylolactone, poly(butylene adipate) and poly(ethylene adipate).

The low-melting polymer segments have a number-average molecular weight in the copolymerized state of preferably about 300 to 6,000.

In cases where the polyester thermoplastic elastomer used is one composed primarily of high-melting crystalline polymer segments made of crystalline aromatic polyester units and low-melting polymer segments made of aliphatic polyether units and/or aliphatic polyester units, it is advantageous to adjust the amount of low-melting polymer segments made of aliphatic polyether units and/or aliphatic polyester units copolymerized relative to the amount of high-melting crystalline polymer segment made of crystalline aromatic polyester units to at least 15 wt %, and preferably at least 50 wt %, but not more than 90 wt %. If the proportion of low-melting polymer segments made of aliphatic polyether units and/or aliphatic polyester units is too high, adequate melt characteristics may not be obtained in the thermoplastic copolymer, which can make it difficult to achieve uniform mixture during melt blending with the other components. On the other hand, if the proportion is too low, sufficient flexibility and resilience may not be achieved.

Examples of polyester thermoplastic elastomers preferred for use in the invention include those in the Hytrel series made by DuPont-Toray Co., Ltd., and those in the Primalloy series made by Mitsubishi Chemical Corporation.

When the isocyanate mixture (B) is prepared, it is desirable for the relative proportions of above components (b-1) and (b-2), expressed as the weight ratio (b-1)/(b-2), to be within a range of 100/5 to 100/100, and especially 100/10 to 100/40. If the amount of component (b-1) relative to component (b-2) is too low, more isocyanate mixture (B) must be added to achieve sufficient addition for the crosslinking reaction with the thermoplastic polyurethane (A). In such cases, component (b-2) exerts a larger effect, which may render inadequate the physical properties of the thermoplastic polyurethane composition serving as the cover stock. If, on the other hand, the amount of component (b-1) is too high, component (b-1) may cause slippage to occur during mixing, making it difficult to prepare the thermoplastic polyurethane composition that serves as the cover material.

The isocyanate mixture (B) can be prepared by blending component (b-1) into component (b-2) and thoroughly working together these components at a temperature of 130 to 250° C. using mixing rollers or a Banbury mixer, then carrying out pelletization or cooling, followed by grinding.

The isocyanate mixture (B) used to work the invention may be a commercial product, a preferred example of which is Crossnate EM30 (made by Dainichi Seika Colour & Chemicals Mfg. Co., Ltd.).

The thermoplastic polyurethane composition used in the invention is a composition containing the above-described thermoplastic polyurethane (A) and isocyanate mixture (B).

Above component (B) is generally included in an amount, per 100 parts by weight of component (A), of at least 1 part by weight, preferably at least 5 parts by weight, and most preferably at least 10 parts by weight, but not more than 100 parts by weight, preferably not more than 50 parts by weight, and most preferably not more than 30 parts by weight. Too little component (B) may make it impossible to achieve a sufficient crosslinking reaction, thus preventing enhancement of the physical properties. On the other hand, too much may result in greater discoloration over time or due to the effects of heat and ultraviolet light, and may also have other undesirable effects, such as lowering resilience.

In addition to the components described above, the thermoplastic polyurethane composition used in the invention may include also other resin components. Illustrative examples of such additional components include polymeric thermoplastic materials other than thermoplastic polyurethane, such as polyester elastomers, polyamide elastomers, ionomer resins, styrene block elastomers, polyethylenes and nylons.

The above polymeric thermoplastic materials other than thermoplastic polyurethane are typically included in an amount, per 100 parts by weight of the thermoplastic polyurethane serving as the essential component, of at least 0 part by weight, preferably at least 5 parts by weight, and most preferably at least 10 parts by weight, but not more than 100 parts by weight, preferably not more than 75 parts by weight, and most preferably not more than 50 parts by weight. These polymeric thermoplastic materials other than polyurethane are selected as appropriate for such purposes as adjusting the hardness of the cover and improving resilience, flow and adhesion.

If necessary, the thermoplastic polyurethane composition of the invention may also include various additives. Examples of such additives include pigments, dispersants, antioxidants, ultraviolet absorbers, ultraviolet stabilizers, parting agents, plasticizers and inert fillers (e.g., zinc oxide, barium sulfate, titanium dioxide).

When such additives are included, the amount of addition may be selected from within ranges that do not compromise the objects of the invention. Typically, such additives are included in an amount, per 100 parts by weight of the thermoplastic polyurethane serving as the essential component, of preferably at least 0.1 part by weight, and most preferably at least 0.5 part by weight, but not more than 10 parts by weight, and most preferably not more than 5 parts by weight.

In the practice of the invention, the golf ball cover may be molded from the above thermoplastic polyurethane composition by adding component (B) to component (A) and dry mixing, then using an injection molding machine to mold the mixture into a cover over the mantle layer enclosing the core. The molding temperature used will depend on the type of component (A), although molding is generally carried out within a temperature range of 150 to 250° C.

If bonding between the mantle layer and the cover is poor, an adhesive may be used therebetween to provide the inventive golf ball with a better durability to impact. The adhesive used may be suitably selected insofar as the objects of the invention can be attained. Preferred examples of such adhesives include chlorinated polyolefin adhesives (e.g., RB182 Primer, made by Nippon Bee Chemical Co., Ltd.), urethane resin adhesives (e.g., Resamine D6208, made by Dainichi Seika Colour & Chemicals Mfg. Co., Ltd.), epoxy resin adhesives, vinyl resin adhesives and rubber adhesives. The thickness of the adhesive layer is not subject to any particular limitation, although a thickness of 0.1 to 30 $\mu$m is preferred. It is also acceptable to use the adhesive on only part of the mantle layer surface.

Reactions and crosslinking which take place in the cover thus obtained are believed to involve the reaction of isocyanate groups with hydroxyl groups remaining on, the thermoplastic polyurethane material to form urethane bonds, or the formation of an allophanate or biuret crosslinked form via an addition reaction in which isocyanate groups are added to the urethane groups on the thermoplastic polyurethane. Although the crosslinking reaction has not yet proceeded to a sufficient degree immediately subsequent to injection molding of the thermoplastic polyurethane composition used as the cover stock, the crosslinking reaction can be made to proceed further by carrying out an annealing step after molding, in this way conferring the golf ball with useful cover characteristics. "Annealing," as used herein, refers to heat aging the cover at a constant temperature for a given length of time, or aging the cover for a fixed period at room temperature.

The cover hardness in the invention, expressed in Shore D hardness units, is at least 52, preferably at least 53, and most preferably at least 56, but generally not more than 63, and preferably not more than 60. Too low a cover hardness makes the ball overly receptive to spin, resulting in decreased distance. On the other hand, too high a cover hardness may cause the spin rate to decline, leading to poor controllability, may lower the durability to cracking with repeated impact and the scuff resistance, and may worsen the feel of the ball upon impact in what golfers refer to as the "short game" or when hit with a putter.

In the practice of the invention, the difference between the cover hardness and the average core hardness, expressed as [(cover hardness)–(average core hardness)] in Shore D hardness units, is at least 5, preferably at least 8, and most preferably at least 10, but not more than 25, preferably not more than 22, and most preferably not more than 20. A [(cover hardness)–(average core hardness)] value which is too large results in lower rebound characteristics, a shorter distance, and a poor durability to cracking with repeated impact. On the other hand, a [(cover hardness)–(average core hardness)] value which is too small gives the ball too hard a feel when hit with a driver (W#1), allows the ball to take on too much spin, giving it too high an arc in flight and thus a shorter distance, and reduces spin stability on what are known as "fliers."

The difference between the cover hardness and the core center hardness, expressed as [(cover hardness)–(core center hardness)] in Shore D hardness units, is generally at least 10, preferably at least 14, and most preferably at least 17, but generally not more than 30, preferably not more than 27, and most preferably not more than 24. A [(cover hardness)–(core center hardness)] value which is too large may result in lower rebound characteristics, a shorter distance, and a poor durability to cracking with repeated impact. On the other hand, a [(cover hardness)–(core center hardness)] value which is too small may give the ball too hard a feel when hit with a driver (W#1), allow the ball to take on too much spin, giving it too high an arc in flight and thus a shorter distance, and reduce spin stability on "fliers."

The mantle layer of the invention is preferably a mixture of (C) an ionomer resin component containing (c-1) an olefin/unsaturated carboxylic acid random bipolymer and/or a metal ion neutralization product of an olefin/unsaturated carboxylic acid random bipolymer and (c-2) an olefin/unsaturated carboxylic acid/unsaturated carboxylic acid ester random terpolymer and/or a metal ion neutralization product of an olefin/unsaturated carboxylic acid/unsaturated carboxylic acid ester random terpolymer, with (D) a non-ionomer thermoplastic elastomer.

The olefin in component (c-1) or (c-2) is preferably an α-olefin. Specific examples of suitable α-olefins include ethylene, propylene and 1-butene. Of these, ethylene is especially preferred. These olefins may also be used in combinations of two or more thereof.

The unsaturated carboxylic acid in component (c-1) or (c-2) is preferably an α,β-unsaturated carboxylic acid having 3 to 8 carbon atoms. Specific examples of α,β-unsaturated carboxylic acid having 3 to 8 carbon atoms include acrylic acid, methacrylic acid, ethacrylic acid, itaconic acid and maleic acid. Of these, acrylic acid and methacrylic acid are preferred. These unsaturated carboxylic acids may also be used in combinations of two or more thereof.

The unsaturated carboxylic acid ester in (c-2) is preferably, but not necessarily, a lower alkyl ester of the above-described unsaturated carboxylic acid. Specific examples include methyl methacrylate, ethyl methacrylate, propyl methacrylate, butyl methacrylate, methyl acrylate, ethyl acrylate, propyl acrylate and butyl acrylate. The use in of butyl acrylate (n-butyl acrylate, i-butyl acrylate) is especially preferred. These unsaturated carboxylic acid esters may be used in combinations of two or more thereof. Such unsaturated carboxylic acid esters help to improve the flexibility of the ionomer resin.

During preparation of the above-described olefin/unsaturated carboxylic acid copolymer or olefin/unsaturated carboxylic acid/unsaturated carboxylic acid ester copolymer, any additional monomer may be copolymerized insofar as the objects of the invention are attainable.

These copolymers have an unsaturated carboxylic acid content of generally at least 4 mol %, preferably at least 6 mol %, more preferably at least 8 mol %, and most preferably at least 10 mol %, but generally not more than 30 mol %, preferably not more than 20 mol %, more preferably not more than 18 mol %, even more preferably not more than 15 mol %, and most preferably not more than 12 mol %. Too low an unsaturated carboxylic acid content may result in a low rigidity and resilience, diminishing the flight performance of the golf ball. On the other hand, too high an unsaturated carboxylic acid content may result in an inadequate flexibility.

When a copolymer composed of an olefin and an unsaturated carboxylic acid as the chief monomers and a copolymer composed of an olefin, an unsaturated carboxylic acid and an unsaturated carboxylic acid ester as the chief monomers are blended together and used, it is preferable for these copolymers to be used in a respective weight ratio of 100:0 to 25:75, and especially 100:0 to 50:50. The use of too much copolymer composed of an olefin, an unsaturated carboxylic acid and an unsaturated carboxylic acid ester as the chief monomers may result in an inadequate resilience.

The ionomer resin (C) used in the practice of the invention is preferably one obtained by neutralizing the above-described copolymer with at least one type of metal FU ion having a valence of 1 to 3. Examples of metal ions having a valence of 1 to 3 that are suitable for neutralization include sodium, potassium, lithium, magnesium, calcium, zinc, aluminum, ferrous ions and ferric ions.

Such metal ions may be introduced by reacting the above-described copolymers with, for example, a hydroxide, methoxide, ethoxide, carbonate, nitrate, formate, acetate or oxide of the aforementioned valence 1 to 3 metals.

The carboxylic acid included within the above copolymer is generally neutralized with metal ions such that at least 10 mol %, and preferably at least 30 mol %, but not more than 100 mol %, and preferably not more than 90 mol %, of the carboxyl groups on the copolymer are neutralized. A low degree of neutralization may result in low resilience.

It is well-known that a good balance between resilience and durability can be achieved in a layer composed primarily of ionomer resin by blending suitable amounts of ionomer resins containing different monovalent, divalent or trivalent metal ionic species. Such blending is preferred in the practice of the invention.

The ionomer resin (C) used in the invention may be a commercial product. Suitable examples of the metal ion neutralization products of random bipolymers in which the chief monomers are an olefin and an unsaturated carboxylic acid include Himilan 1554, Himilan 1557, Himilan 1601, Himilan 1605, Himilan 1706 and AM7311 (all products of DuPont-Mitsui Polychemicals Co., Ltd.), Surlyn 7930 (produced by E.I. du Pont de Nemours and Co., Inc.) and Iotek 3110 and Iotek 4200 (both products of ExxonMobil Chemical). Suitable examples of the metal ion neutralization products of random terpolymers in which the chief monomers are an olefin, an unsaturated carboxylic acid and an unsaturated carboxylic acid ester include Himilan 1855, Himilan 1856 and AM7316 (all products of DuPont-Mitsui Polychemicals Co., Ltd.), Surlyn 6320, Surlyn 8320, Surlyn 9320 and Surlyn 8120 (all products of E.I. du Pont de Nemours and Co., Inc.), and Iotek 7510 and Iotek 7520 (both products of ExxonMobil Chemical).

The non-ionomer thermoplastic elastomer (D) is exemplified by olefin-based thermoplastic elastomers, styrene-based thermoplastic elastomers, polyester-based thermoplastic elastomers, polyurethane-based thermoplastic elastomers and polyamide-based thermoplastic elastomers. These may be used singly or as mixtures of two or more thereof. Of these, the use of an olefin-based thermoplastic elastomer is preferred for good compatibility with the ionomer resin.

No particular limitation is imposed on the olefin-based thermoplastic elastomer, so long as it is a thermoplastic elastomer composed primarily of an olefin. However, the use of an olefin-based thermoplastic elastomer having crystalline polyethylene blocks is preferred.

Suitable examples of crystalline polyethylene block-bearing olefin-based thermoplastic elastomers include those having hard segments composed of crystalline polyethylene blocks (E) or crystalline polyethylene blocks (E) in combination with crystalline polystyrene blocks (S), and having soft segments composed of a relatively random copolymer (EB) of ethylene and butylene. The use of a block copolymer having a molecular structure with a hard segment at one or both ends, such as an E-EB, E-EB-E or E-EB-S structure, is especially preferred.

These olefin-based thermoplastic elastomers can be prepared by the hydrogenation of a polybutadiene or a styrene-butadiene copolymer.

The polybutadiene or styrene-butadiene copolymer used in hydrogenation is preferably a polybutadiene in which the butadiene structure contains 1,4 polymer blocks which are 95 to 100% composed of 1,4 units, and the overall butadiene structure has a 1,4 unit content of 50 to 100 wt %, and most preferably 80 to 100 wt %. That is, the use of a polybutadiene having a 1,4 unit content of 50 to 100 wt %, and especially 80 to 100 wt %, and in which 95 to 100 wt % of the 1,4 units are included within blocks is preferred.

It is especially preferable for olefin-based thermoplastic elastomers having an E-EB-E structure to be prepared by the hydrogenation of a polybutadiene in which both ends of the molecular chain are 1,4 polymerization products rich in 1,4 units, and the center portion of which contains a mixture of 1,4 units and 1,2 units.

The degree of hydrogenation in the polybutadiene or styrene-butadiene copolymer hydrogenation product, expressed as the percent of double bonds in the polybutadiene or styrene-butadiene copolymer that are converted to saturated bonds, is preferably 60 to 100%, and most preferably 90 to 100%. Too low a degree of hydrogenation may lead to deterioration such as gelation in the blending step with the ionomer resin and other components. Moreover, the mantle layer in the completed golf ball may have an inadequate durability to impact.

In the block copolymers having a molecular structure with a hard segment at one or both ends, such as an E-EB, E-EB-E or E-EB-S structure, which are preferable for use as the olefin-based thermoplastic elastomer, the hard segment content is preferably 10 to 50 wt %. A hard segment content which is too high may result in so low a flexibility as to keep the objects of the invention from being effectively achieved, whereas a hard segment content which is too low may lead to problems with formation of the blend.

The olefin-based thermoplastic elastomer described above has a melt index at 230° C. of preferably 0.01 to 15 g/10 min, and most preferably 0.03 to 10 g/10 min. Outside of this range, problems such as weld lines, sink marks and short shots may arise during injection molding.

The olefin-based thermoplastic elastomer has a surface hardness of preferably 10 to 50. Too low a surface hardness may lower the durability of the golf ball to repeated impact, whereas too high a surface hardness may lower the resilience of blends with ionomer resin.

The olefin-based thermoplastic elastomer has a number average molecular weight of preferably 30,000 to 800,000.

The above-described crystalline polyethylene block-containing olefin-based thermoplastic elastomer may be a commercial product, suitable examples of which include Dynaron 6100P, HSB604 and 4600P (all products of JSR Corporation). The use of Dynaron 6100P in this invention is especially preferred because it is a block polymer having crystalline olefin blocks at both ends. These olefin-based thermoplastic elastomers may be used singly or as mixtures of two or more thereof.

The non-ionomer thermoplastic elastomer used as component D in the invention preferably has polar groups grafted thereon so as to improve compatibility with the ionomer resin—an ethylene-acrylic acid copolymer neutralized with alkali metal—which serves as component C. Suitable, non-limiting examples of such polar groups include carboxyl groups, epoxy groups, hydroxyl groups and amino groups.

The non-ionomer thermoplastic elastomer D used in the invention has a Shore D hardness of preferably 20 to 99, more preferably 25 to 95, even more preferably 30-to 90, and most preferably 35 to 85. Too high a hardness may prevent a sufficient softening effect from being achieved, whereas too low a hardness may lower the flight performance.

Components C and D in the invention are used in a weight ratio C/D of preferably 100/0 to 50/50, more preferably 89/11 to 60/40, and most preferably 85/15 to 65/35. Too high a content of component D may make it impossible to improve the durability of the golf ball.

In the invention, component E is a fatty acid of molecular weight 280 to 1,500, or a derivative thereof. With its very low molecular weight compared to components C and D, it serves to adjust the melt viscosity of the mixture to a suitable level and in particular helps enhance flow.

Component E has a relatively high acid group (derivative) content, and can prevent an excessive loss of resilience. The fatty acid or fatty acid derivative used as component E has a molecular weight of generally at least 280, preferably at least 300, more preferably at least 330, and most preferably at least 360, but generally not more than 1,500, preferably not more than 1,000, more preferably not more than 600, and most preferably not more than 500. Too low a molecular weight may result in a loss of heat resistance, whereas too high a molecular weight may make it impossible to improve flow.

Preferred examples of the fatty acid or fatty acid derivative serving as component E include unsaturated fatty acids and derivatives thereof having a double bond or triple bond in the alkyl group, and saturated fatty acids and derivatives thereof in which all the bonds on the alkyl group are single bonds. It is recommended that the number of carbons on the molecule be at least 18, preferably at least 20, more preferably at least 22, and most preferably at least 24, but not more than 80, preferably not more than 60, more preferably not more than 40, and most preferably not more than 30. Too few carbons may result in a loss of heat resistance, and may also make the content of acid groups so high as to cause them to interact with acid groups present on the base resin, diminishing the flow-enhancing effect. On the other hand, too many carbons increases the molecular weight, which may also diminish the flow-enhancing effect.

Specific examples of fatty acids that may be used as component E include stearic acid, 12-hydroxystearic acid, behenic acid, oleic acid, linoleic acid, linolenic acid, arachidic acid and lignoceric acid. Of these, stearic acid, arachidic acid, behenic acid and lignoceric acid are preferred. Behenic acid is especially preferred.

Fatty acid derivatives which may be used as component E include metallic soaps in which the proton on the acid group of the fatty acid has been substituted with a metal ion. Metal ions that may be used in such metallic soaps include $Na^+$, $Li^+$, $Ca^{2+}$, $Mg^{2+}$, $Zn^{2+}$, $Mn^{2+}$, $Al^{3+}$, $Ni^{2+}$, $Fe^{2+}$, $Fe^{3+}$, $Cu^{2+}$, $Sn^{2+}$, $Pb^{2+}$ and $Co^{2+}$. Of these, $Ca^{2+}$, $Mg^{2+}$ and $Zn^{2+}$ are preferred.

Specific examples of fatty acid derivatives that may be used as component E include magnesium stearate, calcium stearate, zinc stearate, magnesium 12-hydroxystearate, calcium 12-hydroxystearate, zinc 12-hydroxystearate, magnesium arachidate, calcium arachidate, zinc arachidate, magnesium behenate, calcium behenate, zinc behenate, magnesium lignocerate, calcium lignocerate and zinc. lignocerate. Of these, magnesium stearate, calcium. stearate, zinc stearate, magnesium arachidate, calcium arachidate, zinc arachidate, magnesium behenate, calcium behenate, zinc behenate, magnesium lignocerate, calcium lignocerate and zinc lignocerate are preferred.

In the practice of the invention, the content of component E relative to the content of the base resin composed of components C and D, expressed as the weight ratio (C+D)/E, is preferably from 100/5 to 100/80, more preferably from 100/10 to 100/40, and most preferably from 100/15 to 100/25. Too little component E may lower the melt viscosity, reducing the workability of the composition, whereas too much may lower the durability.

In the invention, component F is a basic metal compound capable of neutralizing the acid groups in above components C, D and E. When a metal soap-modified ionomer resin (e.g., the metal soap-modified ionomer resins mentioned in the above-cited patent publications) is used alone without including component F in the thermoplastic polyurethane composition, the un-neutralized acid groups present on the metal soap and the ionomer resin undergo exchange reactions during mixture under heating, generating a large amount of fatty acids. Because such fatty acids have a low thermal stability and readily vaporize during molding, they may cause molding defects. Moreover, they adhere to the surface of the molded article, which can greatly lower paint film adhesion.

It is recommended that the basic metal compound used as component F be one that has a high reactivity with the base resin and can increase the degree of neutralization of the mixture without a loss of thermal stability.

E Illustrative examples of the metal ions in the basic metal compound serving as component F include $Li^+$, $Na^+$, $K^+$, $Ca^{2+}$, $Mg^{2+}$, $Zn^{2+}$, $Al^{3+}$, $Ni^{2+}$, $Fe^{2+}$, $Fe^{3+}$, $Cu^{2+}$, $Mn^{2+}$, $Co^{2+}$. Examples of suitable basic metal compounds include basic inorganic metal compounds containing these metal ions, such as magnesium oxide, magnesium hydroxide, magnesium carbonate, zinc oxide, sodium hydroxide, sodium carbonate, calcium oxide, calcium hydroxide, lithium hydroxide and lithium carbonate. A hydroxide or a monoxide is recommended. Calcium hydroxide and magnesium oxide, which have a high reactivity with the base resin, are preferred. Calcium hydroxide is especially preferred.

In the practice of the invention, the content of component F relative to the base resin composed of components C and D, expressed as the weight ratio (C+D)/F, is preferably from 100/0.1 to 100/10, more preferably from 100/0.5 to 100/8, and most preferably from 100/1 to 100/6. Too little component F may fail to yield improved heat stability and resilience, whereas too much may lower the heat resistance of the golf ball material due to the presence of excess basic metal compound.

If necessary, various additives may be included in the mantle layer material. Exemplary additives include pigments, dispersants, antioxidants, ultraviolet absorbers and light stabilizers. Specific examples of such additives include the inert fillers zinc oxide, barium sulfate and titanium dioxide.

The mantle layer in the inventive golf ball has a Shore D hardness of generally at least 50, preferably at least 53, more preferably at least 55, and most preferably at least 58, but generally not more than 70, preferably not more than 65, more preferably not more than 62, and most preferably not more than 60. At too low a mantle layer hardness, the spin rate may increase excessively and the rebound characteristics of the ball may decrease, resulting in a poor light distance. On the other hand, a mantle layer hardness that is too high may lower the ball's durability to cracking under repeated impact and its scuff resistance.

In the practice of the invention, the difference between the cover hardness and the mantle layer hardness, expressed as [(cover hardness)–(mantle layer hardness)] in Shore D hardness units, is –8 or higher ($\geq$–8), preferably –5 or higher, and most preferably –3 or higher, but not more than 5, preferably not more than 4, more preferably not more than 3, and most preferably not more than 2. A [(cover hardness)–(mantle layer hardness)] value which is too high results in poor scuff resistance, a poor feel upon impact in the "short game," and poor spin stability on "fliers." A [(cover hardness)–(mantle layer hardness)] value which is too low results in excessive spin and diminished ball rebound characteristics, yielding a poor distance.

The mantle layer material should have a melt flow rate adjusted to ensure particularly suitable flow characteristics for injection molding and thus improve moldability. Specifically, it is recommended that the melt flow rate (MFR), as measured according to JIS-K7210 at a temperature of 190° C. and under a load of 21.18 N (2.16 kgf), be set to generally at least 0.5 dg/min, preferably at least 1 dg/min, more preferably at least 1.5 dg/min, and even more preferably at least 2 dg/min, but generally not more than 20 dg/min, preferably not more than 10 dg/min, more preferably not more than 5 dg/min, and most preferably not more, than 3 dg/min. Too large or small a melt flow rate may result in a marked decline in melt processability.

It is advantageous for the multi-piece solid golf ball of the invention to have a total gauge, which is the sum of the cover gauge and the mantle layer gauge, of at least 1.5, and preferably at least 2.0 mm, but not more than 3.5 mm, and preferably not more than 3.3 mm. Too large a total gauge may lower the rebound characteristics of the ball, lowering the distance traveled. On the other hand, too small a total gauge may result in a poor durability to cracking upon repeated impact. A cover gauge of at least 0.3 mm but not more than 1.7 mm is preferred. A mantle layer gauge of at least 1 mm but not more than 2 mm is preferred.

Dimples may be formed as desired on the surface of the multi-piece solid golf ball of the invention. The "dimple volume occupancy," abbreviated below as VR and expressed in units of percent, is defined as the ratio of the volume of dimples on the golf ball surface to the volume of a hypothetical golf ball without dimples. For shots taken with a driver (W#1), it is desirable for the multi-piece solid golf ball of the invention to have a VR value of at least 0.66, preferably at least 0.70, and most preferably at least 0.75, but not more than 0.85, preferably not more than 0.82, and most preferably not more than 0.79. At too low a VR value, the ball tends to follow a high arc and does not roll well on landing, resulting in a short total distance. On the other hand, at too high a VR value, the ball:tends to have a low trajectory and thus a poor carry, resulting in a short total distance.

It is advantageous for the multi-piece solid golf ball of the invention to be manufactured so as to have an initial velocity of at least 76.4 m/s, preferably at least 76.6 m/s, and most preferably at least 76.8 m/s, but not more than 77.7 m/s. Too low an initial velocity may result in a poor carry, whereas too high an initial velocity may cause the golf ball to fall outside the specifications set by the Royal and Ancient Golf Club of St. Andrews (R&A) and the United States Golf Association (USGA).

"Initial velocity," as used herein, is a value measured using an initial velocity measuring apparatus of the same type as the USGA drum rotation-type initial velocity instrument approved by the R&A. The ball was temperature conditioned at 23±1° C. for at least 3 hours, and tested in a chamber at a room temperature of 23±2° C. The ball was hit using a 250-pound (113.4 kg) head (striking mass) at an impact velocity of 143.8 ft/s (43.83 m/s). One dozen balls were each hit four times. The time taken to traverse a distance of 6.28 ft (1.88 m) was measured and used to compute the initial velocity. This cycle was carried out over a period of about 15 minutes.

EXAMPLES

Examples of the invention and comparative examples are given below by way of illustration and not be way of limitation.

Examples 1 to 4

Comparative Examples 1 to 9

Golf ball cores were produced by a conventional method using the core formulations shown in Table 1. All component amounts are in parts by weight. In each case, vulcanization was carried out at 157° C. for 15 minutes. Table 1 also gives the physical properties of the cores produced in these examples.

TABLE 1

| Components (parts by weight) | Example | | | | Comparative Example | | | | | | | | |
|---|---|---|---|---|---|---|---|---|---|---|---|---|---|
| | 1 | 2 | 3 | 4 | 1 | 2 | 3 | 4 | 5 | 6 | 7 | 8 | 9 |
| Polybutadiene (1) | 50 | 50 | 50 | 50 | 50 | 50 | 50 | 50 | 50 | 50 | 50 | 50 | 50 |
| Polybutadiene (2) | 50 | 50 | 50 | 50 | 50 | 50 | 50 | 50 | 50 | 50 | 50 | 50 | 50 |
| Zinc acrylate | 27.7 | 24.5 | 22.2 | 25.3 | 24.2 | 22.2 | 22.2 | 22.2 | 15.8 | 35.7 | 37.2 | 12.6 | 26.1 |
| Organic peroxide (1) | 0.6 | 0.6 | 0.6 | 0.6 | 0.6 | 0.6 | 0.6 | 0.6 | 0.6 | 0.6 | 0.6 | 0.6 | 0.6 |
| Organic peroxide (2) | 0.6 | 0.6 | 0.6 | 0.6 | 0.6 | 0.6 | 0.6 | 0.6 | 0.6 | 0.6 | 0.6 | 0.6 | 0.6 |
| Antioxidant | 0.2 | 0.2 | 0.2 | 0.2 | 0.2 | 0.2 | 0.2 | 0.2 | 0.2 | 0.2 | 0.2 | 0.2 | 0.2 |
| Zinc oxide | 21.5 | 22.1 | 24.1 | 22.0 | 29.9 | 27.8 | 23.4 | 22.7 | 25.2 | 17.3 | 16.7 | 27.4 | 22.0 |
| Organosulfur compound | 1 | 1 | 1 | 1 | 0.2 | 1 | 1 | 1 | 1 | 1 | 1 | 1 | 1 |
| Zinc stearate | 5 | 5 | 5 | 5 | 0 | 5 | 5 | 5 | 5 | 5 | 5 | 5 | 5 |
| Core properties | | | | | | | | | | | | | |
| Outside diameter (mm) | 36.40 | 36.40 | 36.40 | 36.40 | 36.40 | 36.40 | 36.20 | 36.40 | 36.40 | 36.00 | 36.40 | 36.40 | 36.40 |
| Hardness (1) | | | | | | | | | | | | | |
| Core surface | 48 | 44 | 41 | 45 | 48 | 41 | 41 | 41 | 35 | 59 | 61 | 31 | 46 |
| Core center | 37 | 36 | 34 | 36 | 37 | 34 | 34 | 34 | 29 | 41 | 42 | 27 | 37 |
| Core average | 43 | 40 | 38 | 41 | 43 | 38 | 38 | 38 | 32 | 50 | 52 | 29 | 41 |

Polybutadiene (1): BR11, made by JSR Corporation.
Polybutadiene (2): BR18, made by JSR Corporation.
Organic Peroxide (1): Percumil D, a made by NOF Corporation. Dicumyl peroxide.
Organic Peroxide (2): Perhexa 3M-40, made by NOF Corporation. 1,1-Bis(t-butylperoxy)-3,3,5-trimethylcyclohexane.
Antioxidant: Nocrac NS-6, made by Ouchi Shinko Chemical Industry Co., Ltd.
Zinc oxide: Sanshu Sanka Aen, made by Sakai Chemical Industry Co., Ltd.
Organosulfur Compound: Zinc pentachlorothiophenol.
Zinc Stearate: Zinc Stearate G, made by NOF Corporation.
Hardness (1):

The surface hardness of the core was measured in accordance with ASTM D-2240. The center hardness of the core was determined by cutting the core into hemispheres, and measuring the hardness at the center in accordance with ASTM D-2240.

Mantle layer-covered cores were obtained by injection molding mantle layer materials of the compositions shown in Table 2 (wherein all component amounts are in parts by weight) within a mold in which a core had been placed. Table 2 also gives the physical properties of the resulting mantle layer-covered cores A.

TABLE 2

| Components (parts by weight) | Example | | | | Comparative Example | | | | | | | | |
|---|---|---|---|---|---|---|---|---|---|---|---|---|---|
| | 1 | 2 | 3 | 4 | 1 | 2 | 3 | 4 | 5 | 6 | 7 | 8 | 9 |
| Himilan 1706 | | | | | | | | 50 | | | | | |
| Himilan 1605 | 65 | 85 | 85 | 65 | 65 | 65 | | 50 | 85 | 65 | 65 | 85 | |
| Himilan 1601 | | | | | | | 60 | | | | | | 60 |
| Dynaron 6100P | 35 | 15 | 15 | 35 | 35 | 35 | 40 | | 15 | 35 | 35 | 15 | 40 |
| Behenic acid | 20 | 20 | 20 | 20 | 20 | 20 | 20 | 20 | 20 | 20 | 20 | 20 | 20 |
| Calcium hydroxide | 2.4 | 2.9 | 2.9 | 2.4 | 2.4 | 2.4 | 2.2 | 2.5 | 2.9 | 2.4 | 2.4 | 2.9 | 2.2 |
| Physical properties | | | | | | | | | | | | | |
| Mantle layer hardness (2) | 56 | 60 | 60 | 56 | 56 | 56 | 51 | 63 | 60 | 56 | 56 | 60 | 51 |
| Outside diameter (mm) | 39.70 | 39.90 | 40.20 | 39.80 | 39.70 | 39.70 | 39.70 | 39.70 | 39.70 | 39.50 | 39.70 | 39.70 | 39.70 |
| Mantle layer gauge (mm) | 1.65 | 1.75 | 1.90 | 1.70 | 1.65 | 1.65 | 1.75 | 1.65 | 1.65 | 1.75 | 1.65 | 1.65 | 1.65 |

Himilan 1706, Himilan 1605, Himilan 1601: Ionomer resins made by DuPont-Mitsui Polychemicals Co., Ltd.
Dynaron 6100P: An olefin-based thermoplastic elastomer made by JSR Corporation.
Behenic Acid: NAA222-S (beads), made by NOF Corporation.
Calcium Hydroxide: CLS-B, made by Shiraishi Kogyo Kaisha, Ltd.
Hardness (2):
The mantle layer material was formed into a 2 mm thick sheet and left to stand for two weeks, following which the Shore D hardness was measured according to ASTM D-2240.

Solid three-piece golf balls were manufactured by injection molding cover stock of the composition shown in Table 3 (wherein all component amounts are in parts by weight) over the mantle layer described above. Dimples were applied to the surface (VR =0.77). Table 3 also gives the physical properties of the resulting solid three-piece golf balls.

TABLE 3

| Components (parts by weight) | Example 1 | Example 2 | Example 3 | Example 4 | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|---|---|
| Adhesive between cover and mantle layer Yes/No | Yes | Yes | Yes | Yes | No | Yes | Yes | Yes | Yes | Yes | Yes | Yes | Yes |
| Himilan 1557 | | | | | 50 | | | | | | | | |
| Himilan 1856 | | | | | 50 | | | | | | | | |
| AM7315 | | | | | | | 50 | | | | | | |
| Pandex T8295 | 50 | | | | | | | 50 | | 50 | | 50 | 100 |
| Pandex T8260 | 50 | 100 | 100 | 100 | | 50 | 100 | 50 | 100 | 50 | 100 | 50 | |
| Titanium dioxide | 4 | 4 | 4 | 4 | 5 | 4 | 4 | 4 | 4 | 4 | 4 | 4 | 4 |
| Polyethylene wax | 1.5 | 1.5 | 1.5 | 1.5 | | 1.5 | 1.5 | 1.5 | 1.5 | 1.5 | 1.5 | 1.5 | 1.5 |
| Isocyanate compound | 10 | 10 | 10 | 10 | | 10 | 10 | 10 | 10 | 10 | 10 | 10 | 10 |
| Physical properties | | | | | | | | | | | | | |
| Cover hardness (3) | 54 | 58 | 58 | 58 | 59 | 62 | 58 | 54 | 58 | 54 | 58 | 54 | 51 |
| Outside diameter (mm) | 42.7 | 42.7 | 42.7 | 42.7 | 42.7 | 42.7 | 42.7 | 42.7 | 42.7 | 42.7 | 42.7 | 42.7 | 42.7 |
| Cover gauge (mm) | 1.50 | 1.40 | 1.25 | 1.45 | 1.50 | 1.50 | 1.50 | 1.50 | 1.50 | 1.60 | 1.50 | 1.50 | 1.50 |

Adhesive: RB182 Primer, made by Nippon Bee Chemical Co., Ltd.

Himilan 1557, Himilan 1856, AM7315: Ionomer resins made by DuPont-Mitsui Polychemicals Co., Ltd.

Pandex T8295, Pandex T8260: Thermoplastic polyurethanes made by DIC Bayer Polymer, Ltd.

Isocyanate Compound: Crossnate EM30, made by Dainichi Seika Colour & Chemicals Mfg. Co., Ltd. Contains 30% 4,4'-diphenylmethane diisocyanate (isocyanate concentration as determined by amine back titration according to JIS K 1556: 5 to 10%). The master batch base resin was a polyester elastomer. This isocyanate compound was mixed and used just prior to injection molding.

Hardness (3):

The cover stock was formed into a 2 mm thick sheet and left to stand for two weeks, following which the Shore D hardness was measured according to ASTM D-2240.

Table 4 shows the different Shore D hardness indicators for the core, mantle layer and cover of each golf ball. Various physical properties of the golf balls are also shown.

TABLE 4

| | Example 1 | Example 2 | Example 3 | Example 4 | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|---|---|
| Type of cover | U | U | U | U | I | U* | U | U | U | U | U | U | U |
| Hardness difference | | | | | | | | | | | | | |
| (Cover) - (Mantle layer) | -2 | -2 | -2 | 2 | 3 | 6 | 7 | -9 | -2 | -2 | 2 | -6 | 0 |
| (Cover) - (Core average) | 11 | 18 | 20 | 17 | 16 | 24 | 20 | 16 | 26 | 4 | 6 | 25 | 10 |
| (Cover) - (Core center) | 17 | 22 | 24 | 22 | 22 | 28 | 24 | 20 | 27 | 13 | 16 | 24 | 14 |
| Hardness | | | | | | | | | | | | | |
| Cover hardness | 54 | 58 | 58 | 58 | 59 | 62 | 58 | 54 | 58 | 54 | 58 | 54 | 51 |
| Core average hardness | 43 | 40 | 38 | 41 | 43 | 38 | 38 | 38 | 32 | 50 | 52 | 29 | 41 |
| Physical properties of ball | | | | | | | | | | | | | |
| Initial velocity (m/s) | 76.8 | 76.9 | 76.8 | 76.8 | 77.0 | 76.7 | 76.5 | 77.0 | 76.7 | 77.4 | 77.4 | 76.9 | 76.6 |
| Fight characteristic | | | | | | | | | | | | | |
| Carry (m) | 184.1 | 182.3 | 181.5 | 182.1 | 184.0 | 182.5 | 180.8 | 183.5 | 178.4 | 185.3 | 185.5 | 176.9 | 181.5 |
| Total distance (m) | 199.4 | 201.2 | 199.8 | 200.5 | 201.1 | 200.4 | 197.9 | 202.6 | 196.5 | 199.5 | 199.2 | 196.9 | 197.6 |
| Spin (rpm) | 2967 | 2799 | 2711 | 2829 | 2905 | 2662 | 2711 | 2760 | 2475 | 3261 | 3271 | 2406 | 2945 |
| Rating Spin | Good | Good | Good | Good | Good | Good | Poor | Good | Poor | Good | Good | Poor | Poor |

TABLE 4-continued

|  | Example | | | | Comparative Example | | | | | | | | |
| --- | --- | --- | --- | --- | --- | --- | --- | --- | --- | --- | --- | --- | --- |
|  | 1 | 2 | 3 | 4 | 1 | 2 | 3 | 4 | 5 | 6 | 7 | 8 | 9 |
| stability | | | | | | | | | | | | | |
| Spin 1 (rpm) | 9208 | 8583 | 8332 | 8688 | 8872 | 8084 | 8379 | 8585 | 7661 | 10046 | 9945 | 7595 | 9268 |
| Spin 2 (rpm) | 4151 | 3727 | 3767 | 3776 | 3584 | 3395 | 3910 | 4133 | 3830 | 3928 | 3431 | 4237 | 4600 |
| Spin retention | 45.1 | 43.4 | 45.2 | 43.5 | 40.4 | 42.0 | 46.7 | 48.1 | 50.0 | 39.1 | 34.5 | 55.8 | 49.6 |
| Rating | Good | Good | Good | Good | Poor | Poor | Good | Good | Good | Poor | Poor | Good | Good |
| Feel | | | | | | | | | | | | | |
| W#1 | Good | Good | Good | Good | Good | Good | Good | Good | Fair | Fair | Poor | Fair | Good |
| PW | Good | Good | Good | Good | Good | Good | Good | Poor | Good | Fair | Fair | Good | Good |
| Putter | Good | Good | Good | Good | Good | Poor | Good | Fair | Good | Fair | Fair | Good | Good |
| Impact durability | Good | Good | Good | Good | Good | Poor | Good | Poor | Poor | Good | Good | Poor | Good |
| Scuff resistance | Good | Good | Good | Good | Poor | Poor | Good | Fair | Good | Fair | Fair | Good | Good |

Type of Cover:
  U: Polyurethane
  I: Ionomer resin
  In Comparative Example 2, the cover was composed of a blend of polyurethane and ionomer.
Hardness:
  Shore D hardnesses shown in Tables 1 to 3.
Flight Performance:
  The spin rate, carry and total distance for each ball were measured when the ball was struck at a head speed of 40 m/s (HS40) with a driver (W#1) mounted on a swing machine made by Miyamae Co., Ltd. The club used for this purpose was a Tour Stage V700 (made by Bridgestone Sports Co., Ltd.) having a loft of 11 degrees. A total distance of at least 199 m was rated as "Good," and a total distance of less than 199 m as "Poor."
Spin Stability:
  The spin rate for each ball was measured when the ball was struck with a number 9 iron (I#9) at a head speed of 38 m/s (HS38). The club used for this purpose was a J's Classical Edition made by Bridgestone Sports Co., Ltd. Percent spin retention was defined as [(Spin 2)/(Spin 1)]× 100, where Spin 2 is the spin rate obtained when Prescale pressure-sensitive film was affixed to the clubface and Spin 1 is the spin rate obtained when nothing was affixed to the clubface. A spin retention of at least 43% was rated as "Good," and a spin retention of less than 43% was rated as "Poor."
Feel:
  The feel of the ball when actually shot with a driver (W#1) by ten amateur golfers having head speeds of 35 to 45 m/s was rated as follows.
    Good: At least 7 of the 10 golfers thought the feel was good
    Fair: From 4 to 6 of the 10 golfers thought the feel was good
    Poor: Three or fewer of the 10 golfers thought the feel was good
Durability to Impact:
  The number of impacts required to produce a 3% decline in successive rebound measurements when the ball was repeatedly struck at a head speed of 43 m/s was determined. Relative durability values were computed based on a value of 100 for the durability of the ball obtained in Example 3, and each ball was rated as follows.
    Good: Relative durability of 95 or more
    Poor: Relative durability of less than 95
Scuff Resistance:
  To examine the scuff resistance, a pitching wedge (PW) with angular grooves on the clubface was mounted on the above-described swing robot and the ball was hit once at a head speed setting of 45 m/s. The scuff resistance was rated as follows.
    Good: Ball can be used again
    Fair: Difficult to decide
    Poor: Ball cannot be used again
  In Comparative Example 1, the cover of the ball was made primarily of an ionomer resin. This ball had a poor scuff resistance and a poor spin stability.
  In Comparative Example 2, the outermost layer was too hard, resulting in a poor feel during shots with a putter and in the "short game." The scuff resistance and spin stability were also inferior.
  In Comparative Example 3, the mantle layer was too soft, lowering rebound and resulting in a short distance.
  In Comparative Example 4, the mantle layer was too hard, giving the ball poor durability to cracking upon repeated impact and poor scuff resistance. In addition, the ball had a poor feel in the "short game."
  In Comparative Example 5, the core was too soft, resulting in a low rebound and poor distance. In addition, the ball had a poor durability to cracking upon repeated impact.
  In Comparative Example 6, the core was too hard relative to the cover. As a result, the ball had too hard a feel when hit. In addition, the spin rate increased too much on shots with a driver (W#1), giving the ball a high arc in flight, which is undesirable when traveling into a headwind. The ball also had a poor spin stability.
  In Comparative Example 7, the average hardness of the core was too high, giving the ball too hard a feel on shots with a driver (W#1). In addition, the spin rate increased too much on shots with a driver (W#1), giving the ball a high arc in flight, which is undesirable when traveling into a headwind. The ball also had a poor spin stability.
  In Comparative Example 8, the average hardness of the core was too low. As a result, when shot with a driver (W#1), the ball had too soft a feel, a low rebound and a poor distance.
  In Comparative Example 9, the cover hardness was too low. As a result, the ball had a low rebound and poor distance when shot with a driver (W#1).
  The multi-piece solid golf balls of the invention provide a good balance between flight performance, controllability, spin stability, feel, scuff resistance and durability to repeated impact.

What is claimed is:

1. A multi-piece solid golf ball comprising a core, at least one mantle layer enclosing the core, and a cover; wherein
the cover is made primarily of a thermoplastic polyurethane composition,
the cover and the mantle layer have a difference in Shore D hardness therebetween such that $-8 \leq [(\text{cover hardness})-(\text{mantle layer hardness})] \leq 5$,
the cover and the core have a difference in Shore D hardness therebetween such that $5 \leq [(\text{cover hardness})-(\text{average core hardness})] \leq 25$,
the core has an average Shore D hardness of 30 to 50,
the cover has a Shore D hardness of at least 52, and
the ball has an initial velocity of at least 76.4 m/s,
wherein the thermoplastic polyurethane composition includes (A) a thermoplastic polyurethane and (B) an isocyanate mixture prepared by dispersing (b-1) a compound having as functional groups at least two isocyanate groups per molecule in (b-2) a thermoplastic resin that is substantially non-reactive with isocyanate.

2. The multi-piece solid golf ball of claim 1, wherein the core is made of an organosulfur compound-containing rubber composition.

3. The multi-piece solid golf ball of claim 1, wherein the difference in Shore D hardness between the cover and the mantle layer is such that $-3 \leq [(\text{cover hardness})-(\text{mantle layer hardness})] \leq 3$.

4. The multi-piece solid golf ball of claim 1, wherein the cover and the core have a difference in Shore D hardness therebetween such that $15 \leq [(\text{cover hardness})-(\text{core center hardness})] \leq 25$.

5. The multi-piece solid golf ball of claim 1, wherein the core has an average Shore D hardness of 35 to 45.

6. The multi-piece solid golf ball of claim 1, wherein the mantle layer is composed primarily of a mixture prepared from a base resin of
(C) an ionomer resin component containing
(c-1) an olefin/unsaturated carboxylic acid random bipolymer and/or a metal ion neutralization product of an olefin/unsaturated carboxylic acid random bipolymer, and
(c-2) an olefin/unsaturated carboxylic acid/unsaturated carboxylic acid ester random terpolymer and/or a metal ion neutralization product of an olefin/ unsaturated carboxylic acid/unsaturated carboxylic acid ester random terpolymer in a weight ratio (c-1)/(c-2) of 100/0 to 25/75, and
(D) a non-ionomer thermoplastic elastomer in a weight ratio C/D of 100/0 to 50/50, to which base resin is added:
(E) a fatty acid having a molecular weight of 280 to 1,500 or a derivative thereof, and
(F) a basic metal compound such as to satisfy the respective weight ratios (C+D)/E=100/5 to 100/80 and (C+D)/F=100/0.1 to 100/10.

7. The multi-piece solid golf ball of claim 6, wherein the non-ionomer thermoplastic elastomer (D) is an olefin thermoplastic elastomer containing crystalline polyethylene blocks as hard segments.

8. The multi-piece solid golf ball of claim 1, wherein said (b-1) compound is selected from a group consisting of an aromatic isocyanate compound, a hydrogenated aromatic isocyanate compound and an alicyclic diisocyanate.

9. The multi-piece solid golf ball of claim 1, wherein said (b-1) compound is tetramethylene diisocyanate or octamethylene diisocyanate.

10. The multi-piece solid golf ball of claim 1, wherein said (b-1) compound is 4,4'-diphenylmethane diisocyanate.

11. The multi-piece solid golf ball of claim 1, wherein said (b-1) compound excludes hexamethylene diisocyanate.

12. The multi-piece solid golf ball of claim 11, wherein the core is made of an organosulfur compound-containing rubber composition.

13. The multi-piece solid golf ball of claim 11, wherein the difference in Shore D hardness between the cover and the mantle layer is such that $-3 \leq [(\text{cover hardness})-(\text{mantle layer hardness})] \leq 3$.

14. The multi-piece solid golf ball of claim 11, wherein the cover and the core have a difference in Shore D hardness therebetween such that $15 \leq [(\text{cover hardness})-(\text{core center hardness})] \leq 25$.

15. The multi-piece solid golf ball of claim 14, wherein the core has an average Shore D hardness of 35 to 45.

16. The multi-piece solid golf ball of claim 14, wherein the mantle layer is composed primarily of a mixture prepared from a base resin of
(C) an ionomer resin component containing
(c-1) an olefin/unsaturated carboxylic acid random bipolymer an/or a metal ion neutralization product of an olefin/unsaturated carboxylic acid random bipolymer, and
(c-2) an olefin/unsaturated carboxylic acid/unsaturated carboxylic acid ester random terpolymer an/or a metal ion neutralization product of an olefin/ unsaturated carboxylic acid/unsaturated carboxylic acid ester random terpolymer in a weight ratio (c-1)/(c-2) of 100/0 to 25/75, and
(D) a non-ionomer thermoplastic elastomer in a weight ratio C/D of 100/0 to 50/50, to which base resin is added:
(E) a fatty acid having a molecular weight of 280 to 1,500 or a derivative thereof, and
(F) a basic metal compound such as to satisfy the respective weight ratios (C+D)/E=100/5 to 100/80 and (C+D)/F=100/0.1 to 100/10.

17. The multi-piece solid golf ball of claim 16, wherein the non-ionomer thermoplastic elastomer (D) is an olefin thermoplastic elastomer containing crystalline polyethylene blocks as hard segments.

18. The multi-piece solid golf ball of claim 14, wherein said (b-1) compound is selected from a group consisting of an aromatic isocyanate compound, a hydrogenated aromatic isocyanate compound and an alicyclic diisocyanate.

19. The multi-piece solid golf ball of claim 14, wherein said (b-1) compound is tetramethylene diisocyanate or octamethylene diisocyanate.

20. The multi-piece solid golf ball of claim 14, wherein said (b-1) compound is 4,4'-diphenylmethane diisocyanate.

21. A multi-piece solid golf ball comprising a core, at least one mantle layer enclosing the core, and a cover; wherein
the cover is made primarily of a thermoplastic polyurethane composition,
the cover and the mantle layer have a difference in Shore D hardness therebetween such that $-8 \leq [(\text{cover hardness})-(\text{mantle layer hardness})] \leq 5$,
the cover and the core have a difference in Shore D hardness therebetween such that $5 \leq [(\text{cover hardness})-(\text{average core hardness})] \leq 25$,
the core has an average Shore D hardness of 30 to 50,
the cover has a Shore D hardness of at least 52, and
the ball has an initial velocity of at least 76.4 m/s, wherein the mantle layer is composed primarily of a mixture prepared from a base resin of
(C) an ionomer resin component containing,
  (c-1) an olefin/unsaturated carboxylic acid random bipolymer and/or a metal ion neutralization product of an olefin/unsaturated carboxylic acid random bipolymer, and
  (c-2) an olefin/unsaturated carboxylic acid/unsaturated carboxylic acid ester random terpolymer and/or a metal ion neutralization product of an olefin/unsaturated carboxylic acid/unsaturated carboxylic acid ester random terpolymer in a weight ratio (c-1)/(c-2) of 100/0 to 25/75, and
(D) a non-ionomer thermoplastic elastomer in a weight ratio C/D of 100/0 to 50/50, to which base resin is added:
(E) a fatty acid having a molecular weight of 280 to 1,500 or a derivative thereof, and
(F) a basic metal compound such as to satisfy the respective weight ratios (C+D)/E=100/5 to 100/80 and (C+D)/F=100/0.1 to 100/10.

22. The multi-piece solid golf ball of claim 21, wherein the non-ionomer thermoplastic elastomer (D) is an olefin thermoplastic elastomer containing crystalline polyethylene blocks as hard segments.

* * * * *